No. 878,259.
PATENTED FEB. 4, 1908.
H. H. WALSH.
REMOVABLE SLEIGH RUNNER FOR VEHICLES.
APPLICATION FILED MAY 28, 1907.
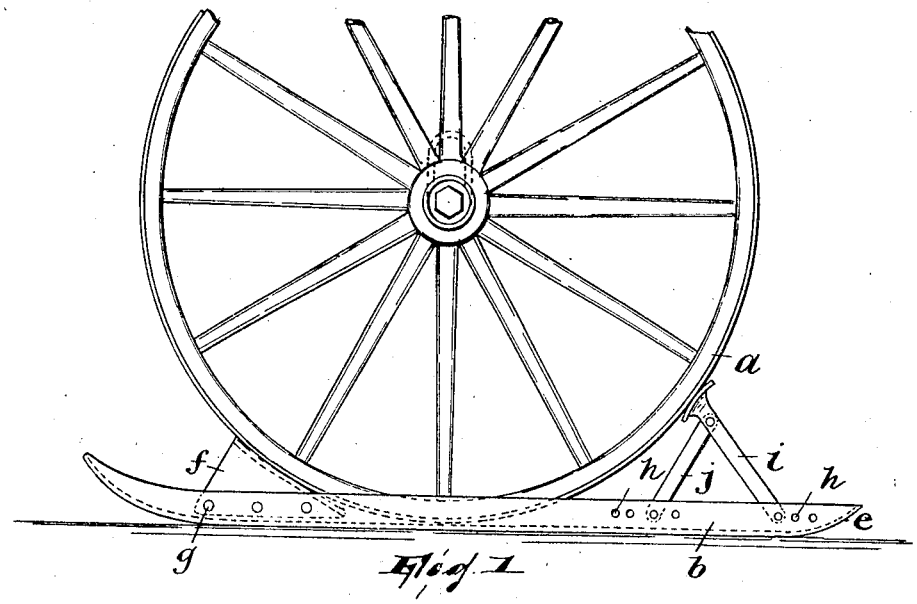
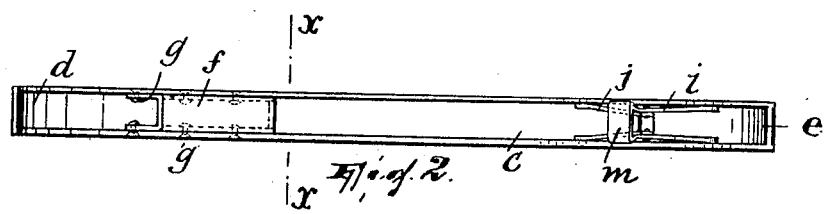
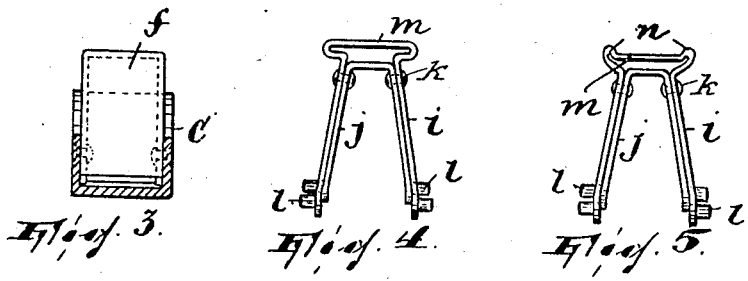
WITNESSES
INVENTOR,
Hiram H. Walsh,
BY
ATTORNEYS

UNITED STATES PATENT OFFICE.

HIRAM H. WALSH, OF NEWBURGH, NEW YORK.

REMOVABLE SLEIGH-RUNNER FOR VEHICLES.

No. 878,259.  Specification of Letters Patent.  Patented Feb. 4, 1908.

Application filed May 28, 1907. Serial No. 376,102.

*To all whom it may concern:*

Be it known that I, HIRAM H. WALSH, a citizen of the United States, residing in Newburgh, Orange county, New York, have invented certain new and useful Improvements in Removable Sleigh-Runners for Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to removable sleigh runners for vehicles, and it has for its object to provide a simple and relatively inexpensive device of this nature which shall be capable of ready attachment and detachment from the wheels of the vehicle, whether loaded or unloaded, adjustable to different diameters of wheels and secured against disengagement from the wheels under ordinary road conditions.

I have illustrated in the accompanying drawings the preferred forms of my invention and shall particularly describe the same in this specification, although it should be understood that changes in the details of the same may be effected without departing from the spirit of my invention as it may be found outlined in the appended claims.

In said drawings, Figure 1 is a side view of a vehicle wheel, showing my improved runner attached thereto; Fig. 2 is a top plan view of the runner detached from the wheel; Fig. 3 is a vertical sectional view of the runner on line $x$—$x$ of Fig. 2; and, Figs. 4 and 5 show two forms of the adjustable back-stop.

$a$, in the drawings, designates the wheel and $b$ the runner.

The runner consists of the channeled runner proper $c$, Fig. 2, having its forward end upturned, as at $d$, so as to ride over ordinary surface irregularities of the road; its rear end is slightly rounded, as at $e$, so that in backing the vehicle the runner will not catch.

Near the forward end of the runner is arranged the chock $f$, which is preferably a blank of sheet metal bent into inverted U-shape and which is inserted into the channel of the runner with its open side down, being secured in place by rivets or the like $g$ passing through the sides of said chock and of the runner.

In the rear portion of the runner, in the sides thereof, are formed two series of holes (or they may be merely recesses entering from the inside) $h$, the one in advance of the other. These holes are adapted to be engaged by the two members of the adjustable back stop, which may be described as follows: The two members $i$ and $j$ of the back-stop are each substantially inverted U-shape and they are pivoted together, say by the rivets $k$ shown best in Figs. 4 and 5. Each has at its lower ends, on the outside, lugs $l$, which lugs are designed to be received by the holes $h$. For this purpose, the members are made of metal having considerable strength as well as some elasticity so that the legs of each may be forced together when the lugs $l$ are to be inserted into or withdrawn from the holes and when in place in the runner will be secured against the lugs being caused to slip out of the holes, in the movements of the vehicle. The upper end of member $i$ may be formed as a broad face $m$, the portion of said member forming the legs thereof being bent first inwardly below said face and then downwardly, which construction has the double advantage of offering broad bearing surface to the wheel tire and adds to the elasticity of the member so that it will yield to a certain extent when the back-stop is adjusted to the wheel.

It will be observed that member $i$ is slightly longer from its face $m$ to the pivot formed by its lugs $l$ than the distance from the tire to said lugs on a radius of the wheel. This arrangement makes it possible to adjust the runner to different diameters of wheels, however they may vary; the member $j$ being first assembled with the runner proper and the wheel being in place against the chock $f$, the lower end of the member $i$ is drawn rearwardly until its lugs fall into such of the holes $h$ as they may engage with the face $m$ of member $i$ bearing squarely against the tire of the wheel, both members yielding as member $i$ is wedged into place. The result is that whatever diameter the wheel may have, it will be firmly held between the chock and the back-stop and play between the wheel and the runner thus prevented.

In Fig. 5 the top of member $i$ is shown recessed so that the lugs $n$ are produced, said lugs acting to prevent lateral play of the wheel on said member.

Having thus fully described my invention, what I claim as new and desire to secure by Letters Patent is:

1. The combination of a runner proper, a wheel supported thereby, a chock arranged on the runner forward of the wheel and engaged thereby, and a back-stop arranged back of the wheel and comprising two members pivoted together and engageable with the runner at different points therein, one of said members bearing against the wheel at a point above a straight line connecting the pivot of said member and the center of the wheel, substantially as described.

2. The combination of a runner proper, a wheel supported thereby, a chock arranged on the runner forward of the wheel and engaged thereby, and a back-stop arranged back of the wheel, having limited elasticity and comprising two members pivoted together and engageable with the runner at different points therein, one of said members bearing against the wheel at a point above a straight line connecting the pivot of said member and the center of the wheel, substantially as described.

In testimony that I claim the foregoing, I have hereunto set my hand this 16th day of May, 1907.

HIRAM H. WALSH.

Witnesses:
JOHN D. STEWARD,
WM. D. BELL.